United States Patent [19]

Ohashi et al.

[11] Patent Number: 5,889,861

[45] Date of Patent: *Mar. 30, 1999

[54] IDENTITY CONFIDENTIALITY METHOD IN RADIO COMMUNICATION SYSTEM

[75] Inventors: Masayoshi Ohashi, Saitama; Seiichiro Sakai; Toshinori Suzuki, both of Tokyo, all of Japan

[73] Assignee: Kokusai Denshin Denwa Co., Ltd, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 573,299

[22] Filed: Dec. 15, 1995

[30] Foreign Application Priority Data

Jan. 12, 1995 [JP] Japan .................................. 7-018819

[51] Int. Cl.$^6$ ................................ H04L 9/00; H04K 1/00
[52] U.S. Cl. ................................ 380/21; 380/28; 380/29; 380/30; 380/49
[58] Field of Search ................................ 380/21, 28, 30, 380/49, 29

[56] References Cited

U.S. PATENT DOCUMENTS

| | | | |
|---|---|---|---|
| 4,200,770 | 4/1980 | Hellman et al. | 380/30 |
| 4,218,582 | 8/1980 | Hellman et al. | 380/30 |
| 4,405,829 | 9/1983 | Rivest et al. | 380/30 |
| 4,949,379 | 8/1990 | Cordell | 380/9 |
| 5,159,633 | 10/1992 | Nakamura | 380/30 |
| 5,222,140 | 6/1993 | Beller et al. | 380/30 |
| 5,280,527 | 1/1994 | Gullman et al. | 380/23 |
| 5,303,303 | 4/1994 | White | 380/49 |
| 5,495,533 | 2/1996 | Linehan et al. | 380/21 |
| 5,577,122 | 11/1996 | Schipper | 380/28 |
| 5,590,197 | 12/1996 | Chen et al. | 380/24 |
| 5,680,458 | 10/1997 | Spelman et al. | 380/21 |

OTHER PUBLICATIONS

"Answers to Frequently Asked Questions About Today's Crytography", RSA Laboratories, Revision 2.0, Oct. 5, 1993, pp. 1–44.

*Primary Examiner*—Gail O. Hayes
*Assistant Examiner*—Hrayr A. Sayadian
*Attorney, Agent, or Firm*—Nikaido Marmelstein Murray & Oram, LLP

[57] ABSTRACT

The radio communication system has at least one first radio station such as a base station and a plurality of second radio stations such as mobile stations. The base station at least possesses a public key, and each of the mobile stations possesses a public-key cryptography function for using the public key and an identity itself. An identity confidentiality method includes steps of generating a time-varying public key at the base station based upon a predetermined time initial, and repeatedly broadcasting, from the base station, the generated time-varying public key to all the mobile stations. The mobile stations cipher their respective identities with the broadcasted time-varying public key so that the encrypted/identities of the mobile stations, which are sent to the base station, remain confidential. After enciphering their identity, the mobile stations wait to be called. When a mobile station is to be called, the base station enciphers the mobile station's identity with the time-varying public key and pages the enciphered identity to all mobile stations.

13 Claims, 7 Drawing Sheets

IDENTITY CONFIDENTIALITY METHOD IN RADIO COMMUNICATION SYSTEM

FIELD OF THE INVENTION

The present invention relates to an identity confidentiality method in a radio communication system. Particularly, the present invention relates to a method of keeping identity confidentiality in a mobile communication system, whereby elemental functions of the network for mobile communication such as call origination, call termination and location registration can be securely performed by using identities encrypted so as to be indistinguishable to third parties in transit.

DESCRIPTION OF THE RELATED ART

The radio transmission via a mobile communication network is more prone to eavesdropping than fixed wire transmission. For example, signal digits transmitted through radio paths can be easily received by third parties. Therefore, it is very important for mobile communication to ensure security.

The security requirements to be ensured in mobile communication consist of (1) protection against "masquerade", (2) security of communicating content, and (3) security of communicating location of a mobile station.

(1) protection against "masquerade"

This is a requirement for preventing unauthorized access to the network by a wrong mobile station who masquerades as a right mobile subscriber. To satisfy this requirement, (a) protection of subscriber identity (ID) against third-party tapping (ID confidentiality), and (b) authentication of an accessed mobile subscriber are necessary. Particularly, (b) is important for realizing this requirement.

(2) Security of Communication Content

This requirement is the most important for security. To satisfy this requirement, (c) enough confidentiality of communicating content by encryption against third-party listening is necessary.

(3) Security of Communicating Location

This is a requirement for preventing mobile subscriber location from disclosure. To satisfy this requirement, (a) protection of subscriber identity against third-party tapping (ID confidentiality) is necessary.

The following is a detailed explanation of (a) ID confidentiality.

For an identity to be transmitted on radio paths, the least secure is to use a public number such as a public telephone number without encryption. A mobile subscriber of this public telephone number can be directly specified by a third party. Some of the existing mobile communication systems have been kept at this security level. To use a secret telephone number as the identity without encryption is also unsecure because a third party can call a mobile subscriber with this secret telephone number. Usage of a public identity number without encryption is the same as the telephone number except that a third party can not call a mobile subscriber with this public identity number.

Usage of a secret identity number will be more secure. However, if the same number will be repeatedly used for accessing a network, a wiretapper may specify the communicating mobile station from this accessed number. Thus, it has been recognized that usage of a temporary secret identity number is the most secure. Since this number is changed at every access or at necessary times, it is very difficult for a wiretapper to specify the subscriber identity.

As a system using such a temporary identity, there is GSM (Global System for Mobil communication) which has spread throughout Europe and is worldwide. Hereinafter, temporary number-allocation in GSM will be described with reference to FIGS. 1 and 2.

In GSM, a subscriber identity IMSI (International Mobile Subscriber Identity), which is secret even to its user, is allocated to the user other than a telephone number. This allocated IMSI is stored into an IC card which is distributed to the user. Initially, a mobile station has no identity, but after the IC card is inserted thereto, the IMSI stored in the card functions as an identity of this mobile station.

A home network possesses this IMSI as shown in FIG. 1 and always manages a location of the mobile station having this IMSI. When the mobile station initially accesses the GSM network, the IMSI is first transmitted from the mobile station via a radio path to a visited network (S101). Then, the visited network performs an authentication process using a secret key cryptography algorithm so as to verify whether this mobile station is a legitimate user or not (S102 and S104). If the mobile station is authenticated, the visited network registers the location of the mobile station (S105 and S106). Then, the visited network allocates a TMSI (Temporary Mobile Subscriber Identity) which is a kind of a penname to the mobile station (S107). The allocated TMSI is stored in a database in the visited network so that it can refer to the corresponding TMSI (S112). Also, this allocated TMSI is ciphered and then the ciphered TMSI Ciph(TMSI) is transmitted via the radio path to the mobile station (S108 and S109). The mobile station deciphers the received cipher Ciph(TMSI) to extract TMSI (S110). The extracted TMSI is then stored in a memory of the IC card (S111). After that, all the accesses between this mobile station and the visited network such as call origination, call termination and location registration are executed by using this TMSI.

As shown in FIG. 2, if the mobile station moves to a new GSM network other than the network storing the above-mentioned TMSI, for example to a GSM network in a neighboring country, the mobile station informs the new location of the previously visited network and the TMSI (hereinafter this previous TMSI is expressed as $TMSI_0$) via the radio path to the newly visited network (S201). The newly visited network inherits IMSI, TMSI, and authentication information etc. from the previously visited network (S202 an S203). The registered location information of this mobile station will be sent to the home network so as to renew its location information (S205). Then, the newly visited network may allocate a new TMSI to the mobile network (S206–S210), or may inherit the previous $TMSI_0$ for the mobile station.

When the mobile station in the visited network is called, this call is terminated to the visited network via the home network and then the mobile stations registered in this visited network are paged with the TMSI. The corresponding mobile station in the visited network responds to this call and will start communication after the authentication.

Thus, according to the GSM, ID confidentiality is performed by identifying a mobile station using the temporal identity of the TMSI.

Confidentiality itself is in general realized by means of encryption. There are two kinds of encryption, namely analog encryption and digital encryption. Depending upon recent development of digital mobile communication, digital encryption has spread further than analog encryption.

Digital encryption is roughly divided into two cryptography systems, one is a secret-key cryptography system and the other is a public-key cryptography system.

The secret-key cryptography system (symmetric cryptosystem), which may be also called as a common-key cryptography system, holds the same key at both ciphering and deciphering sides in common. Only users knowing this secret-key can cipher and decipher a message. This secret-key cryptography has been widely used for confidentiality and authentication algorithms because the secret-key cipher is in general not so complicated and can be processed with high speed. Inner structures of many of the secret-key cipher are kept in secret, but some of them are opened, known as for example DES (National Bureau of Standards Data Encryption Standard) or FEAL (Fast Encipherment Algorithm).

The public-key cryptography system (asymmetric cryptosystem) uses two different keys at ciphering and deciphering sides, respectively. One key used at the ciphering side is called as a public key and the other key used at the deciphering side is called as a private key. The public key is published while the private key is kept secret. Anyone can send a confidential message using the public key, but the message cannot be deciphered without using a private key which is in the sole possession of the intended receiver. Since the public key is based on a mathematical algorithm such as factorization into prime factors, currently available public-key cryptography systems have a problem of low processing speed. Thus, this public-key encryption method is not so widely used in mobile communication. As typical public-key cryptosystems, there are RSA (U.S. Pat. No. 4,405,829) and Rabin cipher for example. The basic ideas of public-key cryptography have been disclosed in U.S. Pat. Nos. 4,200,770 and 4,218,582.

Next, requirements for performing ID confidentiality for mobile communication will be described.

Elemental functions of the network for mobile communication are, as aforementioned, location registration, call origination and call termination.

At location registration, whether the mobile station to be registered is a legitimate subscriber is verified by presenting its identity and by performing the authentication. At call origination, the same verification as that in location registration will be executed in addition to a presentation of a called subscriber number. The requirement for obtaining ID confidentiality at location registration and call origination is that no one, except for the accessed network, can specify the mobile subscriber in accordance with the received signal digits and therefore third parties cannot know who is accessing the network.

At call termination, it is necessary to perform a paging operation. The requirement for obtaining ID confidentiality at the paging operation is that only the called mobile subscriber can confirm this call under the condition that many of the mobile subscribers in the cell are waiting to be called on the same radio channel. It is important that all mobile subscribers, other than the called subscriber, never recognize the paging identity and never mistake this call as a call directed to itself.

In order to satisfy these requirements of ID confidentiality, the aforementioned GSM using a temporal identity is advantageous because secure network control with the mobile station can be expected without always exposing the subscriber ID on the radio paths. However, according to the GSM, the IMSI has to be presented on the radio path when the mobile station initially accesses or when a problem in the network occurs. Furthermore, in the GSM system, a great amount of network resources have to be utilized for managing the TMSI.

The ID confidentiality may be realized by encrypting the identity with a specific secret-key information determined by each user. For example, a confidential identity Si of a user i may be obtained by encrypting its identity IDi with the specific secret-key Ki determined by this user (mobile station) i. Namely, $Si=f_{Ki}(IDi)$. However, this ID confidentiality method using the specific secret-key information of each user has the following problems.

When the mobile station i actively accesses the network due to, for example, location registration or call origination, only this confidential identity Si is directly presented to the network. As the network has in general no information with respect to any mobile stations accessed thereto except for this Si, it is quite difficult to decipher IDi from the received Si. Therefore, in order to perform this ID confidentiality method, it is necessary to have a memory table into which encrypted identities of all the mobile stations are previously stored. This will cause the network resources to greatly increase especially in case of possession of the TMSI.

When such a confidential identity Si is used for paging, it may be that a plurality of mobile stations are simultaneously called with the same Si. Namely, $f_{Ki}=f_{Kj}(IDj)$ may occur for different mobile stations i and j ($i \neq j$), and thus a call for the mobile station i may be misjudged as a call for the mobile station j and vice versa. By appropriately designing, probability of occurrence of such an error will be somewhat reduced by not reduced to zero. In telephone communication, such a problem as a plurality of terminals are simultaneously paged with one number can never be permitted. Similar problems will occur during call origination and location registration.

Accordingly, the conventional ID confidentiality method using the specific information of each user cannot be well operated.

The ID confidentiality may also be realized by encrypting the identity with a specific information about the network. However, if the secret-key cryptography is used for the encryption, anyone who overhears the secret key in transit can know the identity encrypted using that key.

SUMMARY OF THE INVENTION

It is therefore an object of the present invention to provide an identity confidentiality method in a radio communication system, whereby the identity of the mobile station can be securely and effectively hidden from anyone.

The radio communication system according to the present invention has at least one first radio station such as a base station (network) and a plurality of second radio stations such as mobile stations. The base station at least possesses a public key, and each of the mobile stations possesses a) a public-key cryptography function for ciphering with the public key and b) an identity for identifying itself. According to the present invention, particularly, an identity confidentiality method includes the steps of generating a time-varying public key at the base station, and repeatedly broadcasting, from the base station, the generated time-varying public key to all the mobile stations. The mobile stations cipher from the respective identities with the broadcasted time-varying public key.

When the mobile station intends to originate a call or to register its location, this station ciphers its identity with the broadcasted public key and sends the encrypted identity to the base station. The base station receives this encrypted identity and deciphers it using a private key which is kept secret and corresponds to the public key, to obtain the identity. Thus, the identity can be securely provided to only the base station without being exposed to third parties.

Each of the mobile stations prepares in advance a ciphered identity by encrypting its identity with the time-varying public key and waits to be called. When a call to a mobile station is terminated, the base station ciphers the identity, allocated to the called mobile station, with the time-varying public key to obtain a ciphered identity and pages with this ciphered identity. The mobile station receives the paged and ciphered identity and compares the received ciphered identity with the previously prepared ciphered identity. If both of the encrypted identities coincide with each other, the mobile station recognizes the call termination and responds thereto. The mobile station to be called can only respond to the call termination without being known by eavesdropping third parties.

Furthermore, since the public key is time-varying, the encrypted result transmitted on the radio path becomes time-varying, which prevents record and replay attacks. Thus, security of mobile communication can be greatly improved.

It is preferred that the base station further possesses a public-key cryptography function for ciphering with the public key and a plurality of identities of the respective mobile stations, and that the method further includes the steps of, at the mobile station, ciphering its identity with the broadcasted time-varying public key and waiting for a possible call thereto, and at the base station, ciphering the identity corresponding to a mobile station to be called with the time-varying public key and paging the ciphered identity to all the mobile stations.

It is also preferred that the base station further possesses a private key corresponding to the public key and a public-key cryptography function for deciphering a ciphered public key with the private key, and that the method further includes the steps of ciphering at one of the mobile stations the identity with the broadcasted time-varying public key and sending the ciphered identity to the base station, and receiving at the base station the ciphered identity sent from the at least one mobile station and deciphering the received ciphered-identity with the private key to extract the identity.

The ciphering and sending step may include the steps of generating a random number, combining the identity with the generated random number to provide a camouflaged identity, ciphering the camouflaged identity with the broadcasted time-varying public key, and sending the ciphered identity to the base station.

The receiving and deciphering step may include receiving, at the base station, the ciphered identity sent from the mobile station and deciphering the received ciphered-identity with the private key to extract the identity.

The receiving and deciphering step may further include a step of deciphering the received ciphered-identity with the private key and leaving a part of the random number from the deciphered result to extract the identity.

The radio communication system according to the present invention has at least one base station such as a base station and a plurality of mobile stations such as mobile stations. The base station at least possesses a one-way function $f_K$ with a time-varying parameter k whereby for every x in the domain of $f_K$, $f_K(x)$ is easy to compute: but for virtually all y in the range of f, it is computationally infeasible to find an x such that $y=f_K(X)$. Each of the mobile stations possesses the same one-way function and an identity for identifying itself. According to the present invention, particularly an identity confidentiality method includes the steps of transferring, at the mobile station, its identity using the one-way function and waiting for a possible call thereto, transferring, at the base station, the identity corresponding to a mobile station to be called using the one-way function, and paging the transferred identity to all the mobile stations.

Further objects and advantages of the present invention will be apparent from the following description of the preferred embodiments of the invention as illustrated in the accompanying drawings.

DESCRIPTION OF THE PREFERRED EMBODIMENTS

Figure 1:
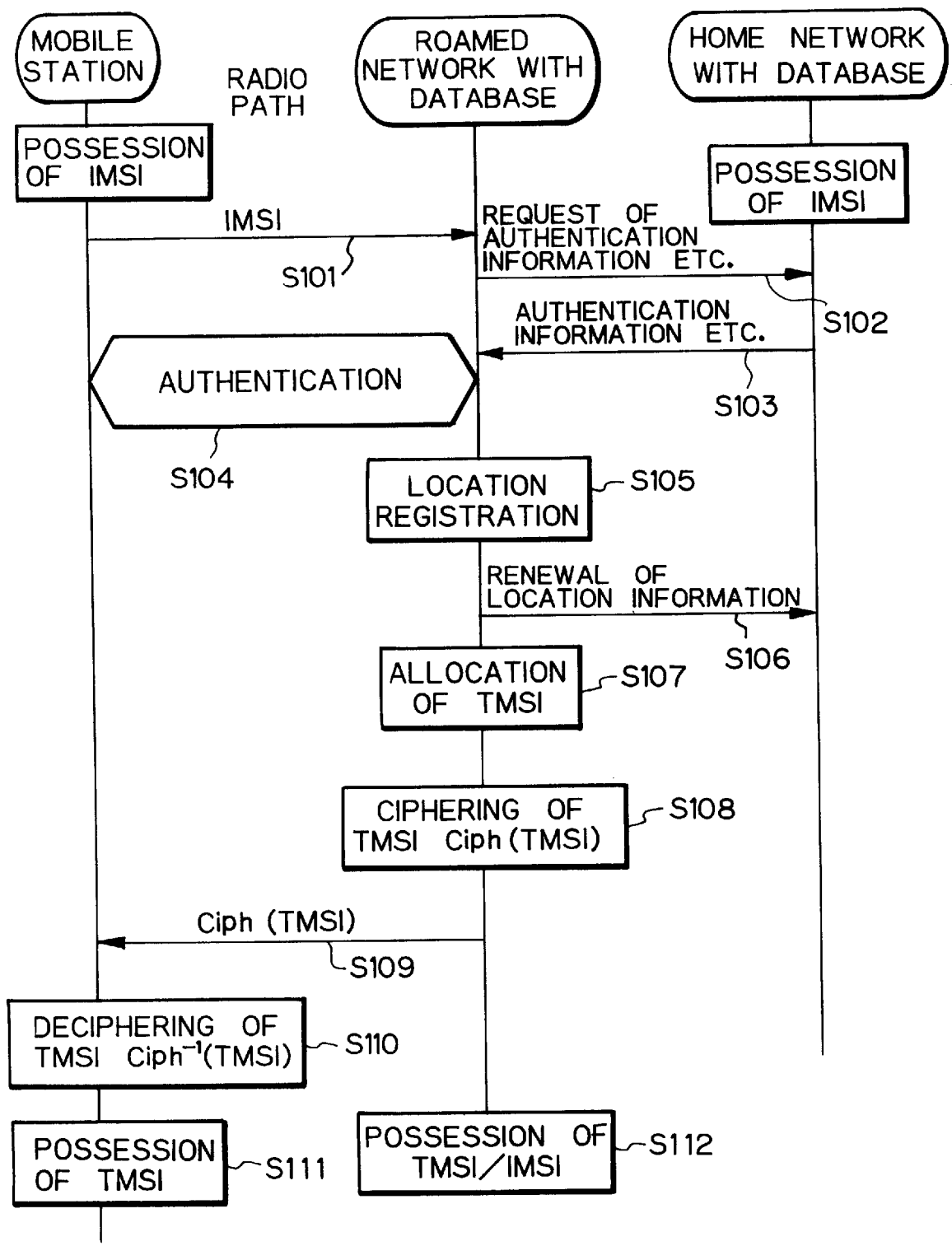
FIG. 1 is a flow chart showing the conventional ID confidentiality method in GSM already described.
Figure 2:
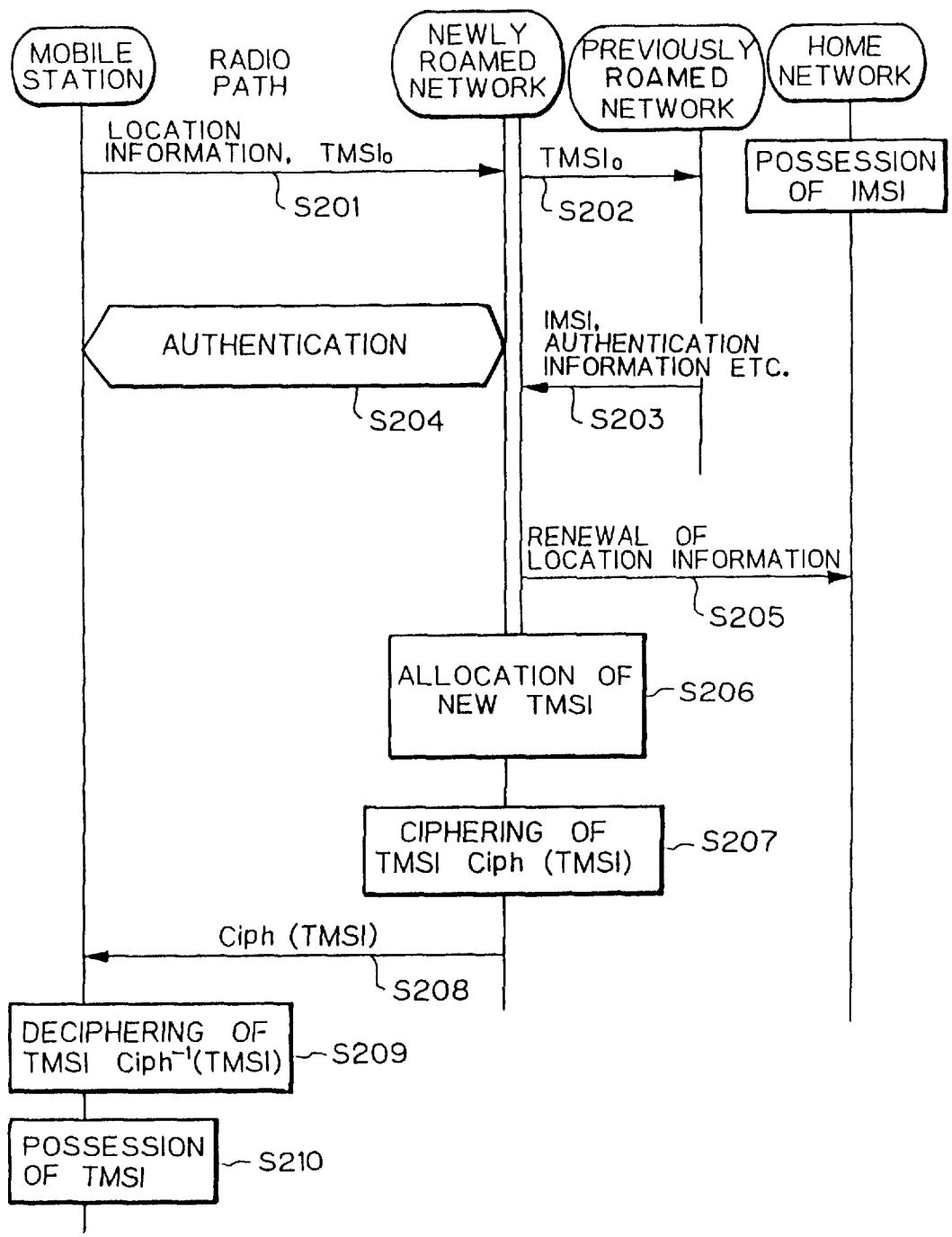
FIG. 2 is a flow chart showing another conventional ID confidentiality method in GSM already described.
Figure 3:
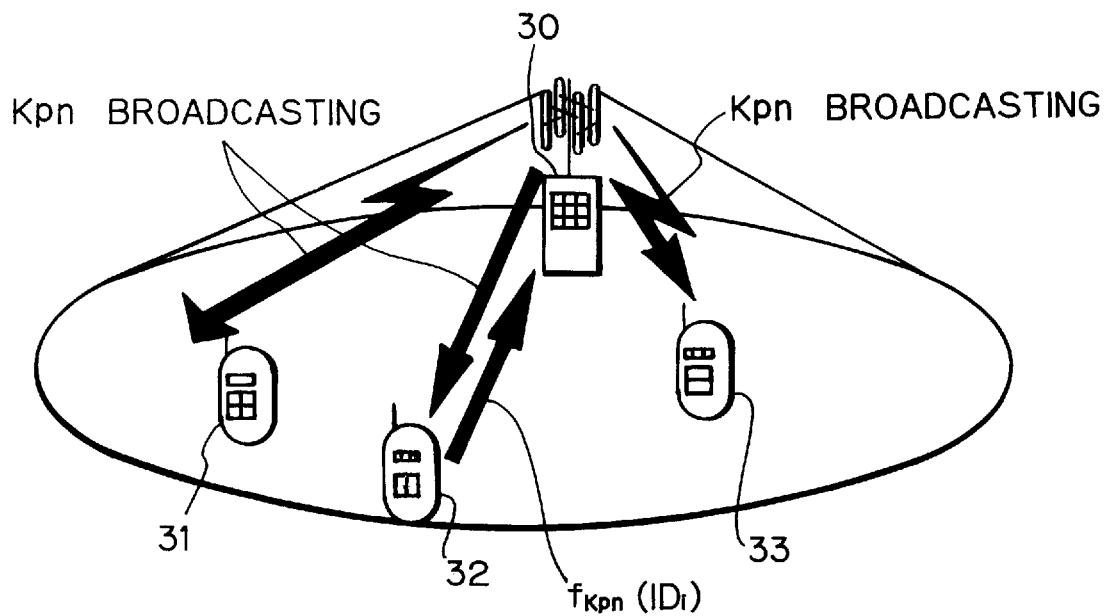
FIG. 3 schematically illustrates operation of location registration/call origination according to the present invention.

In FIG. 3 which schematically illustrates operation of location registration/call origination according to the present invention, reference numeral 30 denotes a base station (network), and 31, 32 and 33 denote mobile stations, respectively. The network 30 always broadcasts a time-varying public key Kpn. When a mobile station i, for example the mobile station 32, intends to originate a call or to register its location, this station 32 ciphers its identity IDi with the public key Kpn and sends the encrypted identity $f_{Kpn}$(IDi) to the network 30. The network 30 receives this encrypted $f_{Kpn}$(IDi) and deciphers it using a private key Ksn, which is kept secret, corresponding to the public key Kpn to obtain the identity IDi.

Figure 4:
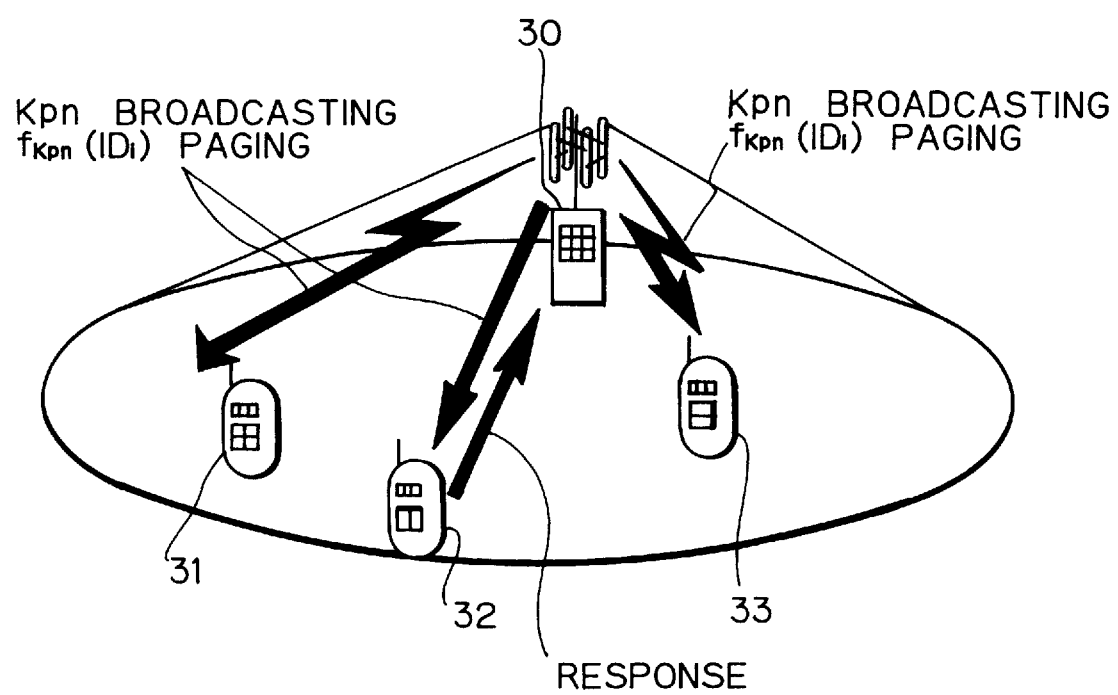
FIG. 4 schematically illustrates operation of paging according to the present invention.

FIG. 4 schematically illustrates operation of paging according to the present invention. The network 30 always broadcasts a time-varying public key Kpn. Each of the mobile stations 31, 32 and 33 prepares in advance the encrypted identity $f_{Kpn}$(ID) by encrypting its identity ID with the broadcasted time-varying public key Kpn and waits to be called. When a call to a mobile station i, for example to the mobile station 32, is terminated, the network 30 ciphers the identity IDi allocated to this station 32 with the time-varying public key Kpn to obtain the encrypted identity $f_{Kpn}$(IDi) and pages with this ciphered identity $f_{Kpn}$(IDi). The mobile station 32 receives the encrypted identity $f_{Kpn}$(IDi) and compares the received encrypted identity $f_{Kpn}$(IDi) with the previously prepared encrypted identity $f_{Kpn}$(IDi). If both of the encrypted identities coincide with each other, the mobile station 32 recognizes it is a call termination and responds thereto.

Figure 5:
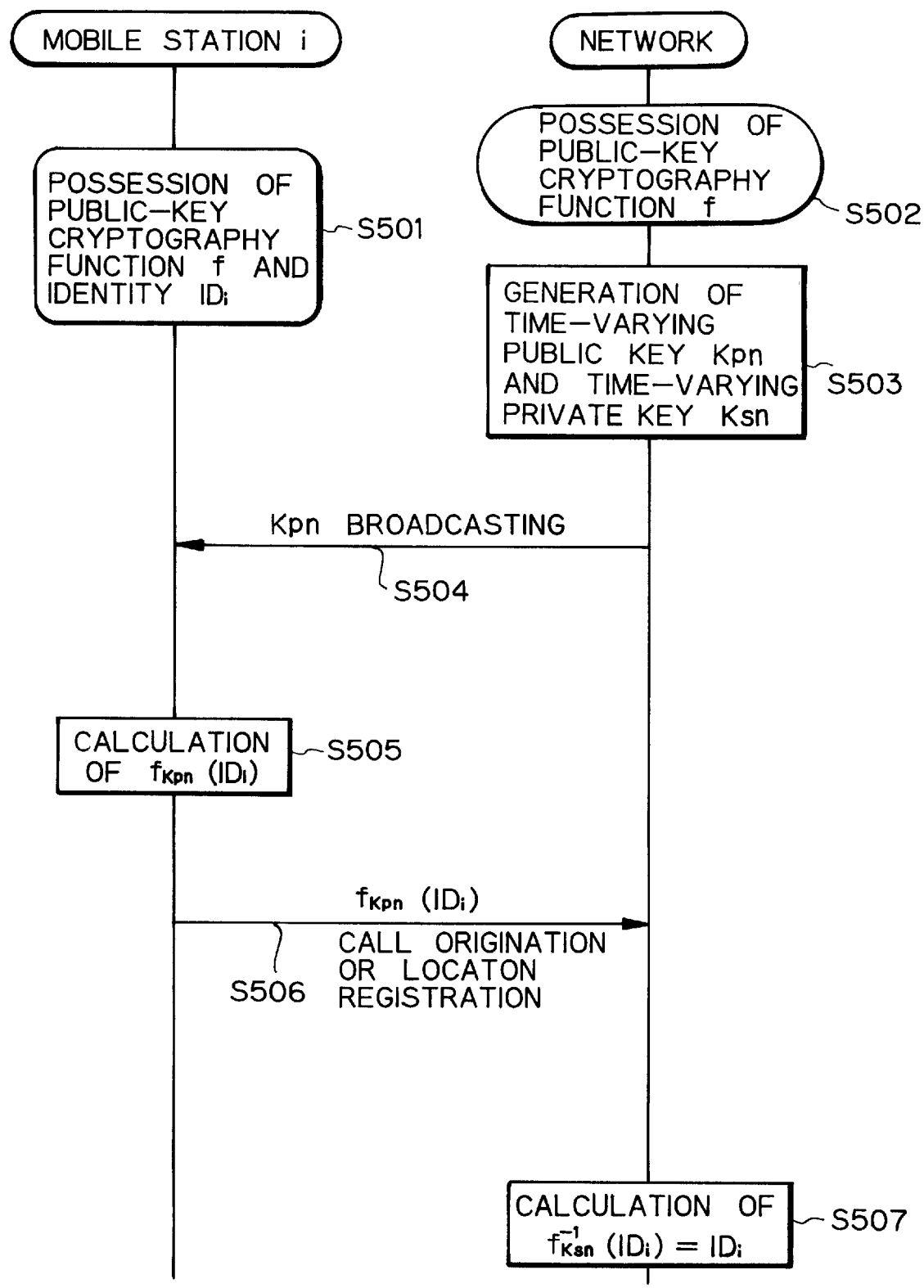
FIG. 5 is a flow chart showing operation of location registration/call origination of a preferred embodiment according to the present invention.

FIG. 5 is a flow chart showing an operation when a mobile station confidentially sends its identity to a network due to, for example, location registration or call origination in a preferred embodiment according to the present invention.

The mobile station i possesses public-key cryptography function f and an identity IDi allocated to itself in advance (S501). On the other hand, the network possesses the same public-key cryptography function f(S502). The network has a feature of generating a time-varying public key Kpn and a time-varying private key Ksn which corresponds to the public key Kpn (S503). This generation of the time-varying keys Kpn and Ksn is, in this embodiment, repeated at a predetermined time interval. The generated public Kpn is repeatedly broadcasted (S504). The public key Kpn is thus published while the private key Ksn is kept secret.

When the mobile station i intends to originate a call or to register its location, this mobile station ciphers its own identity IDi with the broadcasted time-varying public key Kpn (S505) and sends the encrypted identity $f_{K_{pn}}$ (IDi) to the network (S506). The network receives this encrypted identity $f_{K_{pn}}$ (IDi) and deciphers it using the time-varying private key Ksn corresponding to the public key Kpn to extract the identity IDi (S507). Since the private key Ksn is kept secret except for this network, anyone who overhears the encrypted identity $f_{K_{pn}}$ (IDi) in transit cannot know the identity IDi. Furthermore, since the public key Kpn is time-varied, for example changed at a predetermined interval, the encrypted result $f_{K_{pn}}$ (IDi) transmitted on the radio path becomes time-varying, which prevents record and replay attacks. Thus, security of mobile communication can be greatly improved.

Figure 6:
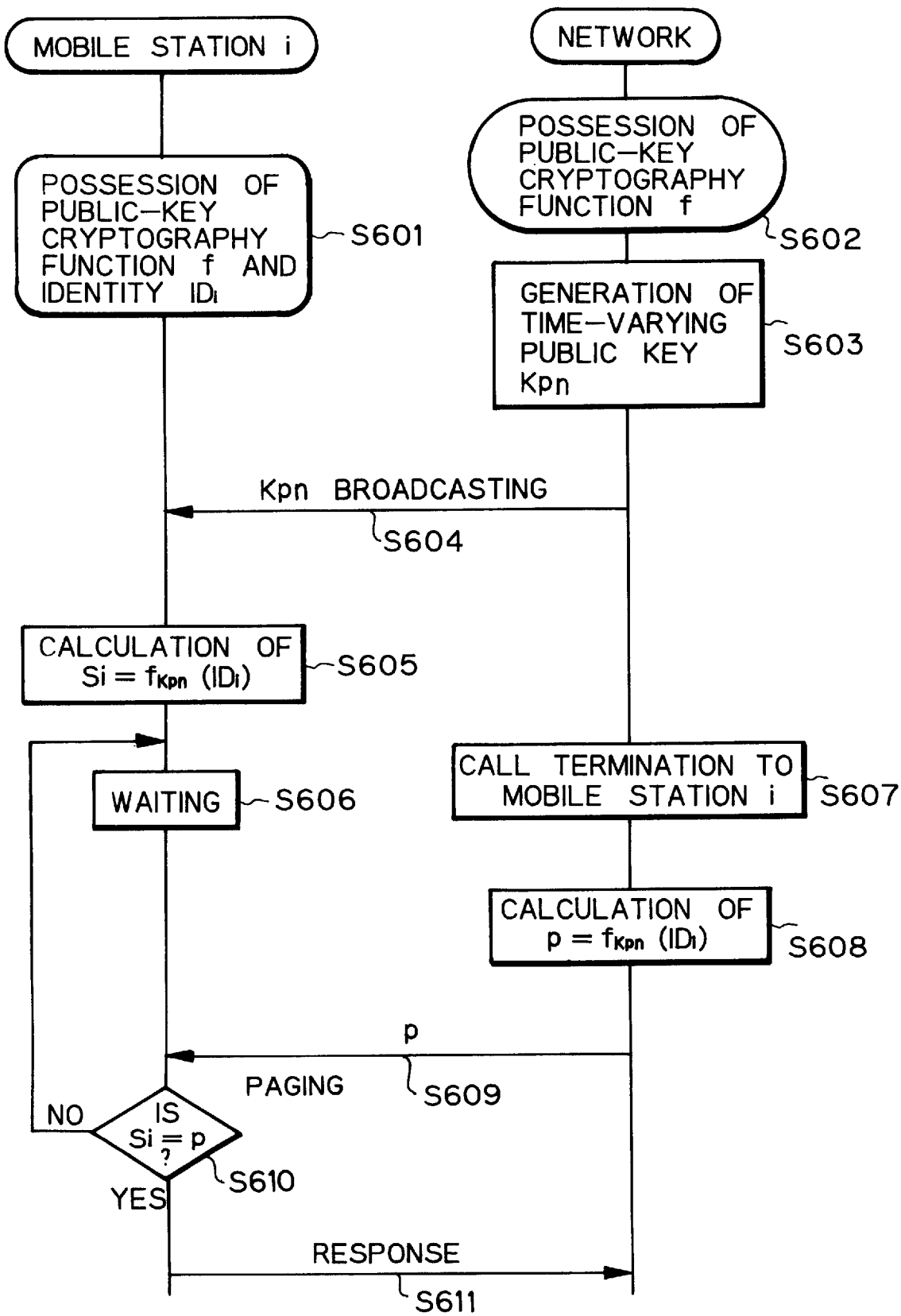
FIG. 6 is a flow chart showing operation of paging of the embodiment of FIG. 5.

FIG. 6 is a flow chart showing operation of paging due to call termination in the embodiment of FIG. 5.

The mobile station i possesses the public-key cryptography function f and the identity IDi allocated to itself in advance (S601). On the other hand, the network possesses the same public-key cryptography function f (S602). The network has a feature of generating a time-varying public key Kpn, but it is not necessary to generate a private key Ksn (S603). This generation of the time-varying public key Kpn is, in this embodiment, repeated at a predetermined time interval. The generated public key Kpn is always broadcasted (S604). The public key Kpn is thus published.

The mobile station i calculates in advance a confidential identity $S_i = f_{K_{pn}}$ (IDi) by encrypting its identity IDi with the broadcasted time-varying public key Kpn each time this public key Kpn is updated (S605). Then, the mobile station i waits to be called (S606). When a call to a mobile station i is terminated, the network ciphers the identity IDi allocated to this mobile station i with the time-varying public key Kpn to obtain a paged identity $p = f_{K_{pn}}$ (IDi) (S608), and pages with this paged identity p (S609). The mobile station i receives the paged identity p and compares the received paged identity p with the previously calculated confidential identity Si (S610). If both of the encrypted identities coincide with each other, namely if Si=p, the mobile station determines that it is called and sends a response to the network (S611). If it is not Si=p, the mobile station will return to the call-waiting state (S606). All mobile stations except for this mobile station i cannot calculate the confidential identity Si because they do not know the identity IDi. For the mobile stations other than the station i, the paged identity p will look like a random number. In other words, it is required that the allocated identity IDi has to be kept secret. Since the public key Kpn is time-varied, for example changed at a predetermined interval, the encrypted result $f_{K_{pn}}$ (IDi) transmitted on the radio path becomes time-varying, which prevents record and replay attacks. Thus, security of mobile communication can be greatly improved.

It should be noted that, according to this identity ID confidentiality method, since different identities are mapped to different confidential identities Si, there will never occur such a problem that a plurality of users (mobile stations) are simultaneously called with the same confidential identity Si.

As will be understood, in the aforementioned paging, deciphering calculation of the encrypted identity with the private key is not necessary. Therefore, instead of the above-mentioned public-key cryptography method, a cryptography using a one-way function $f_K$ with a time-varying parameter k may be used whereby for every x in the domain of $f_K$, $f_K(x)$ is easy to compute: but for virtually all y in the range of f, it is computationally infeasible to find an x such that $Y=f_K(X)$.

Figure 7:
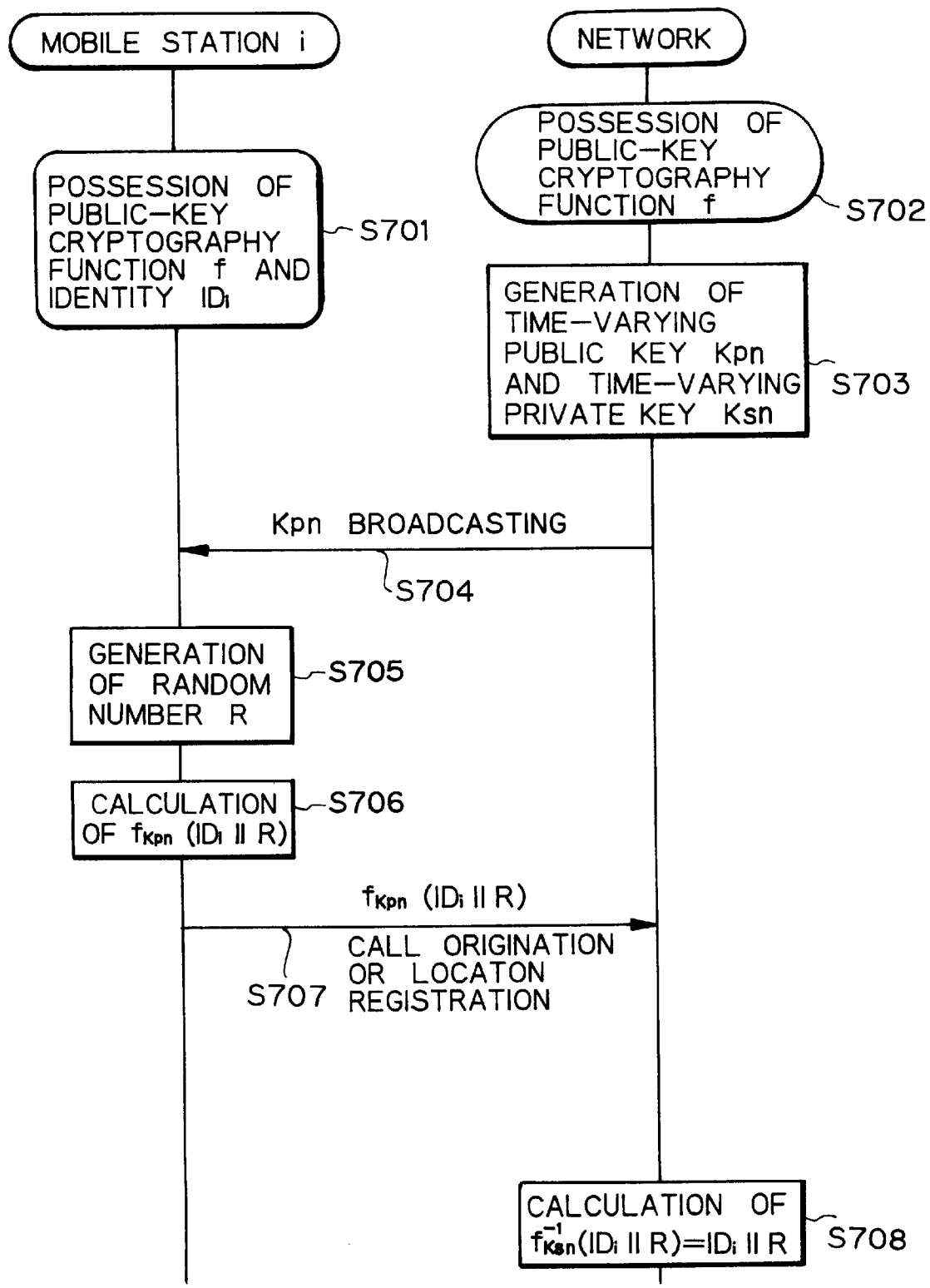
FIG. 7 is a flow chart showing operation of location registration/call origination of another embodiment according to the present invention.

FIG. 7 is a flow chart showing operation when a mobile station confidentially sends its identity to a network due to, for example, location registration or call origination in another embodiment according to the present invention.

The mobile station i possesses a public-key cryptography function f and an identity IDi allocated to itself in advance (S701). On the other hand, the network possesses the same public-key cryptography function f (S702). The network has a feature of generating a time-varying public key Kpn and a time-varying private key Ksn which corresponds to the public key Kpn (S703). This generation of the time varying keys Kpn and Ksn is, in this embodiment, repeated at a predetermined time interval. The generated public key Kpn is repeatedly broadcasted (S704). The public key Kpn is thus published while the private key Ksn is kept secret.

When the mobile station i intends to originate a call or to register its location, this mobile station generates a random number R (S705) and combines its own identity IDi with this random number R to provide a camouflaged identity IDi∥R. Then, the mobile station ciphers this camouflaged identity IDi∥R with the broadcasted time-varying public key Kpn (S706) and sends the encrypted identity $f_{K_{pn}}$ (IDi∥R)to the network (S707). The combination of the identity IDi with the random number R may be performed, for example, by adding a predetermined number of bits of the random number R after the last bit of the identity IDi.

The network receives this encrypted camouflaged identity $f_{K_{pn}}$ (IDi∥R)and deciphers it using the time-varying private key Ksn corresponding to the public key Kpn to extract the camouflaged identity IDi∥R (S708). The identity IDi can be obtained by leaving the last predetermined number of bits of the extracted camouflaged identity IDi∥R, which corresponds to the random number R. Since the private key Ksn is kept secret except for this network, anyone who overhears the encrypted identity $f_{K_{pn}}$ (IDi∥R) in transit cannot know the camouflaged identity IDi∥R, and therefore the identity IDi. Furthermore, since the public key Kpn is time-varied, for example changed at a predetermined interval and the camouflaged identity IDi∥R is always variable, the encrypted result $f_{K_{pn}}$ (IDi∥R) transmitted on the radio path is always variable on each access, which prevents record and replay attacks. In this case, the public key Kpn may not be time-varying since the random number R makes the encrypted result variable. Thus, security of mobile communication can be greatly improved.

Many widely different embodiments of the present invention may be constructed without departing from the spirit and scope of the present invention. It should be understood that the present invention is not limited to the specific embodiments described in the specification, except as defined in the appended claims.

What is claimed is:

1. An identity confidentiality method in a radio communication system having at least one first radio station and a plurality of second radio stations, said first radio station at least possessing a public key, a public-key cryptography function which uses the public key and a plurality of identities of the respective second radio stations, each of said second radio stations possessing a public-key cryptography function which uses the public key and an identity for identifying the second radio station, said method comprising the steps of:

generating a time-varying public key in accordance with a predetermined function at said first radio station;

repeatedly broadcasting, from said first radio station, the generated time-varying public key to all said second radio stations;

enciphering an identity of each second radio station, at each said second radio station, with the broadcasted time-varying public key;

at each second radio station, after enciphering its identity with the broadcasted time-varying public key, waiting for a possible call thereto; and at the first radio station, enciphering the identity corresponding to a second radio station to be called with the time-varying public key and paging the enciphered identity to all the second radio stations.

2. The method as claimed in claim 1, wherein said first radio station further possesses a private key corresponding to the public key, and a public-key cryptography function for deciphering an enciphered identity of each second radio stations with the private key, and wherein said method further comprises the steps of enciphering at one of the second radio stations the identity thereof with the broadcasted time-varying public key and sending the enciphered identity to the first radio station, and receiving at the first radio station the enciphered identity sent from the at least one second radio station and deciphering the received enciphered identity with the private key to extract the identity of the second radio station.

3. The method as claimed in claim 2, wherein said exciphering and sending step includes the steps of generating a random number, combining the identity with the generated random number to provide a camouflaged identity, exciphering the camouflaged identity with the broadcasted time-varying public key, and sending the exciphered camouflaged identity to the first radio station.

4. The method as claimed in claim 3, wherein said receiving and deciphering step includes the steps of receiving, at the first radio station, the enciphered camouflaged identity sent from the second radio station and deciphering the received enciphered-camouflaged identity with the private key to extract the identity of the second radio station.

5. The method as claimed in claim 4, wherein said receiving and deciphering step further includes the step of deciphering the received exciphered identity with the private key and leaving a part of the random number from the deciphered result to extract the identity.

6. The method as claimed in claim 1, wherein said predetermined function is a predetermined time interval.

7. An identity confidentiality method in a radio communication system having at least one first radio station and a plurality of second radio stations, said first radio station possessing a public key, a private key corresponding to the public key, a public-key cryptography function for deciphering an enciphered identity of the respective second radio stations with the private key and a plurality of identities of the respective second radio stations, each of said second radio stations possessing a public-key cryptography function which uses the public key and possessing an identity for identifying the second radio station, said method comprising the steps of:

generating a time-varying public key in accordance with a predetermined function at said first radio station;

repeatedly broadcasting, from said first radio station, the generated time-varying public key to all said second radio stations;

enciphering, at one of the second radio stations, the identity of the second station with the broadcasted time-varying public key and sending the enciphered identity to the first radio station;

receiving at the first radio station the enciphered identity sent from the second radio station and deciphering the received enciphered identity with the private key to extract the identity of the second radio station;

at each second radio station, after enciphering its identity with the broadcasted time-varying public key, waiting for a possible call thereto; and at the first radio station, enciphering the identity corresponding to a second radio station to be called with the time-varying public key and paging the enciphered identity to all the second radio stations.

8. The method as claimed in claim 7, wherein said exciphering and sending step includes the steps of generating a random number, combining the identity with the generated random number to provide a camouflaged identity, exciphering the camouflaged identity with the broadcasted time-varying public key, and sending the exciphered camouflaged identity to the first radio station.

9. The method as claimed in claim 8, wherein said receiving and deciphering step includes the steps of receiving, at the first radio station, the enciphered camouflaged identity sent from the second radio station and deciphering the received enciphered-camouflaged identity with the private key to extract the identity of the second radio station.

10. The method as claimed in claim 9, wherein said receiving and deciphering a step further includes a step of deciphering the received exciphered identity with the private key and leaving a part of the random number from the deciphered result to extract the identity.

11. The method as claimed in claim 7, wherein said predetermined function is a predetermined time interval.

12. An identity confidentiality method in a radio communication system having at least one first radio station and a plurality of second radio stations, said first radio station possessing a one-way function $f_K$ with a time-varying parameter k wherein for every x in a domain of $f_K$, $f_K(X)$ is easy to compute but for virtually all y in a range of f, it is computational infeasible to find an x such that $y=f_K(x)$, said one-way function being capable of using a time-varying parameter, each of said second radio stations possessing the same one-way function and possessing an identity for identifying the second radio station, said method comprising the steps of:

generating a time-varying parameter in accordance with a predetermined function at said first radio station;

repeatedly broadcasting, from said first radio station, the generated time-varying parameter to all said second radio stations;

enciphering an identity of each second radio station at each said second radio station, with the broadcasted time-varying parameter;

transferring, at each second radio station, its identity using said one-way function and waiting for a possible call thereto;

transferring, at the first radio station, the identity corresponding to a second radio station to be called using said one-way function; and paging the transferred identity to all the second radio stations.

13. The method as claimed in claim 12, wherein said predetermined function is a predetermined time interval.

\* \* \* \* \*